(12) United States Patent
Rappold et al.

(10) Patent No.: US 12,545,579 B2
(45) Date of Patent: Feb. 10, 2026

(54) METHOD FOR SYNTHESIZING A HYDROGEN-CONTAINING COMPOUND

(71) Applicant: GASCONTEC GMBH, Bad Homburg v. d. Höhe (DE)

(72) Inventors: Dorit Rappold, Frankfurt (DE); Ulrich Koss, Bad Soden (DE)

(73) Assignee: GASCONTEC GMBH, Bad Homburg vor der Hohe (DE)

( * ) Notice: Subject to any disclaimer, the term of this patent is extended or adjusted under 35 U.S.C. 154(b) by 849 days.

(21) Appl. No.: 17/418,958

(22) PCT Filed: Dec. 12, 2019

(86) PCT No.: PCT/EP2019/084836
§ 371 (c)(1),
(2) Date: Jun. 28, 2021

(87) PCT Pub. No.: WO2020/136014
PCT Pub. Date: Jul. 2, 2020

(65) Prior Publication Data
US 2022/0119254 A1 Apr. 21, 2022

(30) Foreign Application Priority Data
Dec. 27, 2018 (EP) .................................. 18248041

(51) Int. Cl.
*C01B 3/38* (2006.01)
*C01B 3/50* (2006.01)
*C07C 29/152* (2006.01)

(52) U.S. Cl.
CPC .............. *C01B 3/382* (2013.01); *C01B 3/503* (2013.01); *C07C 29/152* (2013.01);
(Continued)

(58) Field of Classification Search
CPC .......... B01D 2257/108; B01D 53/1475; B01D 53/229; C01B 2203/0244;
(Continued)

(56) References Cited

U.S. PATENT DOCUMENTS

| 4,181,675 A | 1/1980 | Makin |
| 4,348,486 A | 9/1982 | Calvin |

(Continued)

FOREIGN PATENT DOCUMENTS

| EP | 0047596 A1 | 8/1981 |
| EP | 0233076 A2 | 8/1987 |

(Continued)

OTHER PUBLICATIONS

Wagner et al. EP3205622A1 English Translation (Year: 2017).*
(Continued)

*Primary Examiner* — Sally A Merkling
*Assistant Examiner* — Jordan W Taylor
(74) *Attorney, Agent, or Firm* — CANTOR COLBURN LLP

(57) ABSTRACT

The invention relates to a method for synthesising a hydrogen-containing compound, wherein a synthesis gas stream (1) comprising hydrogen and carbon oxides is fed to a methanol reactor arrangement (2) for partial conversion into methanol, wherein a methanol residual gas stream (3) is obtained from the methanol reactor arrangement (2), at least part of said methanol residual gas stream (3) being fed to a CO2 remover (4) from which a synthesis recycle stream (5) and a CO2 product stream (6) are obtained, said CO2 product stream (6) having a higher molar carbon dioxide content than the methanol residual gas stream (3), and wherein part of the synthesis recycle stream (5) is fed to the methanol reactor arrangement (2). The method according to the invention is characterised in that part of the synthesis (Continued)

recycle stream (5) is fed to a hydrogen separator (7) from which a separation stream (8) is obtained which has a higher molar hydrogen content than the synthesis recycle stream (5). The invention also relates to a corresponding system for synthesising a hydrogen-containing compound.

17 Claims, 3 Drawing Sheets

(52) U.S. Cl.
CPC .............. *C01B 2203/0244* (2013.01); *C01B 2203/0283* (2013.01); *C01B 2203/061* (2013.01)

(58) Field of Classification Search
CPC ...... C01B 2203/0283; C01B 2203/061; C01B 3/382; C01B 3/501; C01B 3/503; C07C 29/152; C07C 31/04; Y02P 20/50
See application file for complete search history.

(56) References Cited

U.S. PATENT DOCUMENTS

| | | | | |
|---|---|---|---|---|
| 5,472,986 | A * | 12/1995 | van Dijk | C07C 29/1518 518/703 |
| 6,301,927 | B1 * | 10/2001 | Reddy | F25J 3/0252 62/619 |
| 6,444,712 | B1 * | 9/2002 | Janda | C10G 3/49 518/706 |
| 9,102,532 | B2 * | 8/2015 | Iaquaniello | C01B 3/38 |
| 9,969,666 | B1 * | 5/2018 | Roesch | C07C 31/04 |
| 2003/0191196 | A1 * | 10/2003 | Madhubhai | C01B 3/48 518/704 |
| 2009/0018220 | A1 * | 1/2009 | Fitzpatrick | C12C 11/02 518/700 |
| 2009/0069452 | A1 * | 3/2009 | Robota | C07C 29/151 518/728 |
| 2009/0117024 | A1 * | 5/2009 | Weedon | F25J 3/0266 423/437.1 |
| 2011/0294907 | A1 * | 12/2011 | Allam | B01J 19/0053 518/703 |
| 2011/0313064 | A1 * | 12/2011 | Panza | C01B 3/50 422/620 |
| 2015/0323248 | A1 * | 11/2015 | Terrien | F25J 3/0223 62/619 |
| 2019/0016655 | A1 * | 1/2019 | Yiu | C07C 29/152 |

FOREIGN PATENT DOCUMENTS

| | | | | |
|---|---|---|---|---|
| EP | 3205622 | A1 * | 8/2017 | ............ B01J 8/0457 |
| EP | 3284733 | A1 | 2/2018 | |
| GB | 2092172 | A * | 8/1982 | ............ C10G 3/00 |
| RU | 2641306 | C2 | 1/2018 | |
| WO | 2017137581 | A1 | 8/2017 | |

OTHER PUBLICATIONS

Russian Office Action for corresponding application 2021121991 filed Dec. 12, 2019; Dated Apr. 26, 2022.
Russian Search Report for corresponding application 2021121991 filed Dec. 12, 2019; Dated Apr. 23, 2022.
International Search Report for corresponding application PCT/EP2019/084836 filed Dec. 12, 2019; Mail date Feb. 25, 2020.

* cited by examiner

METHOD FOR SYNTHESIZING A HYDROGEN-CONTAINING COMPOUND

TECHNICAL FIELD

The disclosure relates to a method for synthesizing a hydrogen-containing compound and a system for synthesizing a hydrogen-containing compound.

BACKGROUND

Carbon dioxide is produced as exhaust gas when methanol is produced from a raw material such as natural gas. As a rule, said carbon dioxide is released into the atmosphere as a component of a combustion exhaust gas at low pressure. The carbon dioxide only makes up between 5% and 30% of the combustion exhaust gas. The combustion exhaust gas can arise in the furnace of a steam reformer or in a fired heating device for heating a process stream. Said devices are fired with both natural gas and other residual gases that accumulate at various points in a methanol system. About 50% to 80% of the carbon atoms in the raw material are regularly a component of the methanol produced, so that the residual carbon atoms in the raw material, that is, up to 50%, essentially become carbon dioxide in the combustion exhaust gas.

Carbon dioxide released into the atmosphere poses a risk to the world's climate. For this reason, particularly, there is increasing global legislation that restricts or prohibits the large-volume release of carbon dioxide into the environment.

The extraction and storage of carbon dioxide from the combustion exhaust gas of a furnace or a fired heating device, for example, carried out with an ammonia scrubbing, an amine scrubbing, or by another absorptive scrubbing process, is known from the prior art. The specifications disclosed in EP 2230000 A1, EP2564915 A1 and EP2678093 A1 should be mentioned by way of example.

However, these approaches from the prior art are so energetically complex and expensive that they significantly reduce the efficiency of the system and significantly increase investment costs. Furthermore, the devices required for said approaches are very large and the exhaust gases treated with the scrubbings can contain traces of the absorbent or of reaction or decomposition products of the absorbent, which in turn can represent a potential health or environmental hazard.

For example, a possibility from US2014080071 A1 is known, which, however, is also energetically complex and expensive, to convert the fired heating device to the so-called oxyfuel technology. This is done by replacing the fed combustion air with a mixture consisting of oxygen generated in an air separation device and recirculated CO2. The combustion exhaust gas from the combustion carried out in the heating device then mainly consists only of water vapor and CO2.

From EP 3 284 733 A1, a method and a system for synthesizing methanol is known in which carbon dioxide is scrubbed out by means of ammonia from a gas stream which is obtained as residual gas from a methanol condensation downstream of a reactor. Scrubbing with ammonia makes it possible here to obtain the scrubbed carbon dioxide with a high degree of purity on the one hand and with a sufficiently high pressure on the other hand so that it can be stored with less effort.

However, the carbon dioxide pollution of the atmosphere from other carbon dioxide-containing emission sources from the methanol system remains, such as, particularly, combustion exhaust gases, for example, from the fired heating device of the methanol system. Said heating device is usually fired with natural gas and/or other carbon-containing residual gas streams from the methanol system. Said combustion exhaust gases usually represent a considerable proportion, namely between 30% and 70%, of the carbon dioxide emissions of the methanol production system. Said combustion gases cannot be avoided using the method known from EP 3 284 733 A1.

BRIEF SUMMARY

The disclosure improves the method known from the prior art and the system known from the prior art in such a way that the carbon dioxide emissions from other emission sources of the methanol system such as, particularly, the combustion exhaust gases, can be reduced and thus a large part of the carbon dioxide pollution of the methanol production system can be avoided overall.

The disclosure is based on the knowledge that carbon dioxide pollution of the environment can be further reduced in that fired heating devices and similar apparatus can be fed by a gas which consists largely of hydrogen, since the combustion of the hydrogen only leads to water. However, no particularly pure hydrogen stream is required for said reduction; rather, the presence of further components is not very harmful. Therefore, no pressure swing adsorption system, which can provide a hydrogen stream of very high purity, is required for the provision of such a gas. Rather, for example, a membrane device can be used to separate the hydrogen. Such alternatives indeed offer a lower purity of the hydrogen stream, but also provide the residual gas at a higher pressure so that said residual gas can also be returned to the reactor for the synthesis gas production without subsequent compression or at least with less compression. Both the environmental pollution and the energy requirements for operating the system can be reduced in this way. As a result, a large part, starting from about 30%, of the emissions of carbon dioxide into the atmosphere can be avoided. It may even be that carbon dioxide emissions into the atmosphere can be avoided essentially completely and thus essentially 100%.

Furthermore, on this basis, it is possible to obtain a carbon dioxide product stream having high purity and at a high pressure. The high purity and the high pressure are very advantageous for the further processing or storage of the carbon dioxide, for example, in the context of a CO2 sequestration also known as CCS.

A preferred variant provides for the production of the synthesis gas by autothermal reforming. This also makes it possible to provide the synthesis gas at a high pressure from the outset so that process gas and other gases obtained therefrom are also available at higher pressures at points downstream of the synthesis gas production.

A preferred embodiment describes advantageous types of separation of a residual gas stream from the crude methanol downstream of the methanol reactor, whereas other embodiments describe the use of a membrane device as a hydrogen separator and related features in more detail.

Further described are advantageous embodiments of the CO2 remover for producing the carbon dioxide product stream and particularly the scrubbing arrangement and compressor arrangement thereof as possible components.

BRIEF DESCRIPTION OF THE DRAWINGS

Further details, features, and advantages of the present disclosure are explained below with reference to the drawing, which shows only exemplary embodiments. The drawing shows FIG. 1 schematically the flow diagram of a system for carrying out the proposed method according to an embodiment, FIG. 2 schematically the flow diagram of the scrubbing arrangement of the CO2 remover of the system of FIG. 1, FIG. 3 schematically the flow diagram of the compressor arrangement of the CO2 remover of the system of FIG. 1.

DETAILED DESCRIPTION

Figure 1:
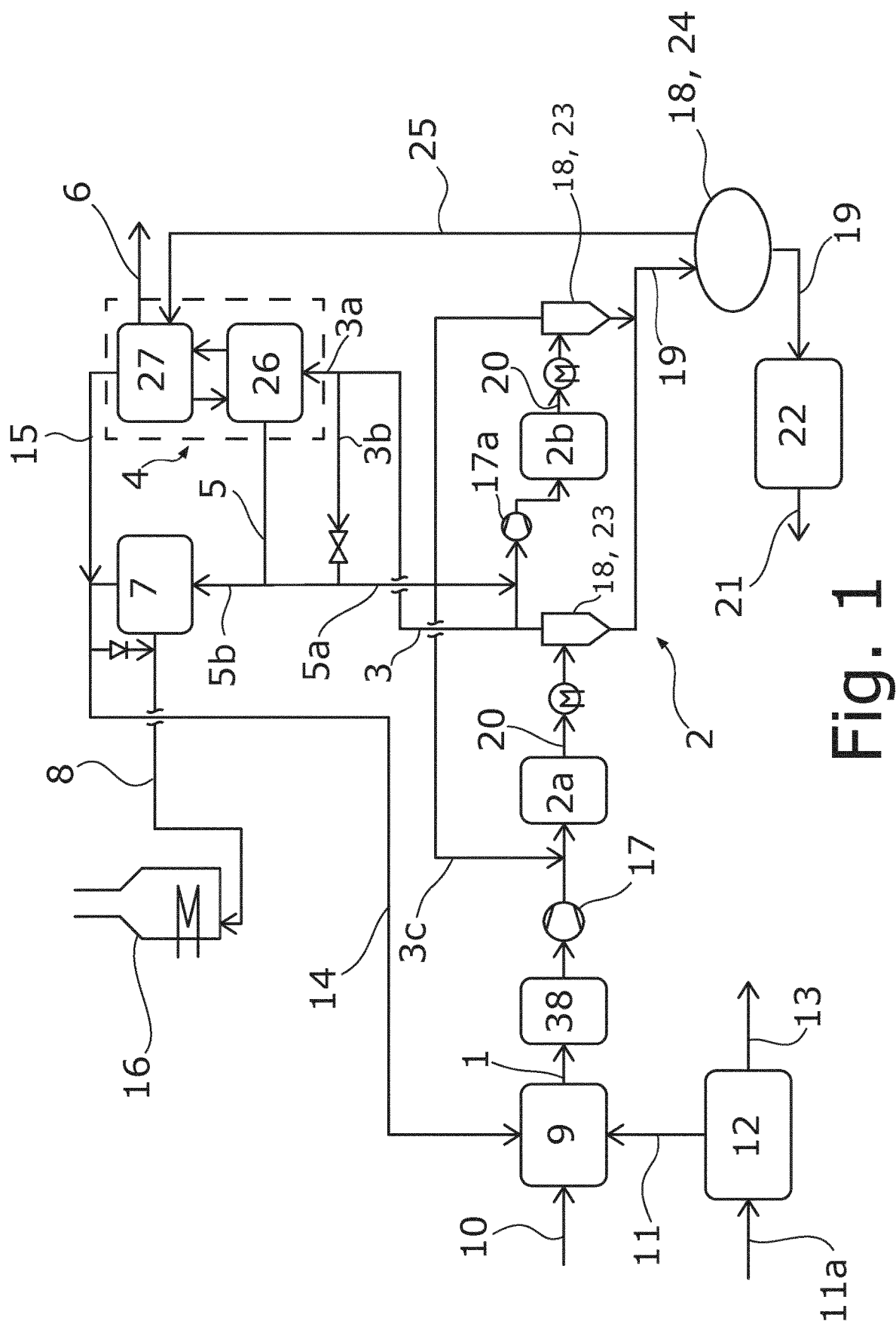

The proposed method is used for synthesizing a hydrogen-containing compound. The hydrogen-containing compound can particularly be methanol. However, it can also be another hydrogen-containing compound and particularly a substance which is obtained from further processing of methanol. The proposed method is explained below with reference to the proposed system shown in the drawing.

According to the proposed method, a synthesis gas stream 1 comprising hydrogen and carbon oxides is fed to a methanol reactor arrangement 2 for partial conversion into methanol. In addition to hydrogen and carbon oxides, the synthesis gas stream can also comprise further components such as nitrogen, methane or noble gases. The partial conversion of the synthesis gas stream 1 into methanol takes place in a manner known per se from the prior art. The methanol reactor arrangement 2 can in principle comprise any number of reactor stages 2a, for example, only one reactor stage 2a. In the embodiment of FIG. 1, the methanol reactor arrangement 2 comprises two reactor stages 2a, b arranged in series in terms of process technology.

According to the proposal, a methanol residual gas stream 3 is obtained from the methanol reactor arrangement 2, at least part of said methanol residual gas stream 3 being fed to a CO2 remover 4, from which CO2 remover 4 a synthesis recycle stream 5 and a CO2 product stream 6 are obtained.

The methanol residual gas stream 3 is preferably made predominantly of unreacted synthesis gas from the methanol reactor arrangement 2.

According to the proposal, the CO2 product stream 6 has a higher molar carbon dioxide proportion than the methanol residual gas stream 3. In particular, the CO2 product stream 6 can essentially be made of carbon dioxide. Likewise, it is correspondingly preferred that the CO2 product stream 6 has a higher molar carbon dioxide proportion than the synthesis recycle stream 5.

According to the proposal, as can be seen from FIG. 1, part of the synthesis recycle stream 5 is fed to the methanol reactor arrangement 2. The proposed method is characterized in that part of the synthesis recycle stream 5 is fed to a hydrogen separator 7, from which a separation stream 8 is obtained, said separation stream having a higher molar hydrogen proportion than the synthesis recycle stream 5. The part of the synthesis recycle stream 5 which is fed to the methanol reactor arrangement 2 can also be referred to as the first recycle partial stream 5a. Correspondingly, the part of the synthesis gas stream 5 which is fed to the hydrogen separator 7 can be referred to as the second recycle partial stream 5b.

In principle, the methanol residual gas stream 3 can be completely fed to the CO2 remover 4. However, it is preferred that, as shown in FIG. 1, part of the methanol residual gas stream 3 is fed to the methanol reactor arrangement 2, which therefore corresponds to a recirculation to the methanol reactor arrangement 2. Said recirculation can take place in that the methanol residual gas stream 3 has two partial streams 3a, b, of which the first partial stream 3a is fed to the CO2 remover 4. The second partial stream 3b in turn can then either be fed to the synthesis gas stream 1, specifically either upstream or downstream of the synthesis gas compressor 17 to be described below. Alternatively and as shown in the drawing, the second partial stream 3b can also be fed to that part of the synthesis recycle stream 5 which is fed to the methanol reactor arrangement 2. In the present embodiment, this is the first recycle partial stream 5a.

According to the proposed method, the proposed system is used for synthesizing a hydrogen-containing compound. This hydrogen-containing compound is preferably methanol. The proposed system comprises the methanol reactor arrangement 2, to which methanol reactor arrangement 2 is fed the synthesis gas stream 1 comprising hydrogen and carbon oxides for partial conversion into methanol and for obtaining the methanol residual gas stream 3. The proposed system further comprises the CO2 remover 4, to which at least part of the methanol residual gas stream 3 is fed for obtaining the synthesis recycle stream 5 and the CO2 product stream 6, wherein the CO2 product stream 6 has a higher molar carbon dioxide proportion than the methanol residual gas stream 3 and wherein part of the synthesis recycle stream 5 is fed to the methanol reactor arrangement 2.

The proposed system is characterized in that the system comprises the hydrogen separator 7, to which part of the synthesis recycle stream 5 is fed for obtaining the separation stream 8, and further in that the separation stream 8 has a higher molar hydrogen proportion than the synthesis recycle stream 5.

In principle, the synthesis gas stream 1 can be produced in any desired manner. However, it is preferred that the synthesis gas stream 1 is produced from a carbon-containing energy carrier stream 10 in a synthesis gas reactor arrangement 9. It can especially be that the carbon-containing energy carrier stream 10 comprises natural gas or consists essentially of natural gas. As shown in FIG. 1 and preferably, an oxygen-containing stream 11 is fed to the synthesis gas reactor arrangement 9 for producing the synthesis gas stream 1. According to one variant, said oxygen-containing stream 11 can be ambient air 11a.

In principle, the synthesis gas stream 1 can be produced in the synthesis gas reactor arrangement 9 in any desired manner, for example, by steam reforming. However, it is preferred and in accordance with the embodiment in FIG. 1 that the synthesis gas stream 1 is produced in the synthesis gas reactor arrangement 9 by autothermal reforming from the carbon-containing energy carrier stream 10. It is then especially preferred that the oxygen-containing stream 11 is produced from an air separation device 12 for producing a nitrogen stream 13. Both the nitrogen stream 13 and the oxygen-containing stream 11 can then be produced from the ambient air 11a. It can then also be that the oxygen-containing stream 11 consists essentially of oxygen. In the autothermal reforming known per se from the prior art, a catalytic partial oxidation provides the heat required for the endothermic reforming reactions. The synthesis gas reactor arrangement 9 can also comprise a pre-reformer or a desulfurization system for pretreating the carbon-containing energy carrier stream 10.

With regard to the hydrogen separator 7, it can be the case that, in addition to the separation stream 8, further streams are also obtained from the hydrogen separator 7. Provision is therefore preferably made for a reform recycle stream 14 to be obtained from the hydrogen separator 7, said reform recycle stream 14 having a higher molar methane proportion than the synthesis recycle stream 5. Said methane proportion stems from the methane contained in the methanol residual gas stream 3. Correspondingly, the reform recycle stream 14 preferably also has a higher molar methane proportion than the separation stream 8. The reform recycle stream 14 is preferably the remainder of the synthesis recycle stream 5, which remains after the separation stream 8 has been separated by the hydrogen separator 7.

In principle, said reform recycle stream 14 can be used in any desired manner. It is preferred here that, as depicted in FIG. 1, the reform recycle stream 14 is fed to the synthesis gas reactor arrangement 9 for producing the synthesis gas stream 1. The methane contained in the reform recycle stream 14 can then be converted into synthesis gas and thus used for synthesizing methanol. Likewise, the separation stream 8 can in principle be used as desired. However, the separation stream 8 is preferably fed to a fired heating device 16 for combustion. The fired heating device 16 can be configured, for example, to heat one or more process streams and/or process steam. The fired heating device 16 generates correspondingly little carbon dioxide due to the increased hydrogen proportion of the separation stream 8.

Such a generation and recirculation of a methane-containing stream such as the reform recycle stream 14 does not, however, have to be limited to the hydrogen separator 7. Thus, according to the representation in FIG. 1, it is also preferred that a further reform recycle stream 15 is obtained from the CO2 remover 4. In principle, the further reform recycle stream 15 can also be used in any desired manner. Preferably and as depicted in the drawing, the further reform recycle stream 15 is combined with the reform recycle stream 14. Therefore, the further reform recycle stream 15 is also preferably fed to the synthesis gas reactor arrangement 9 for producing the synthesis gas stream 1. It is further preferred that the further reform recycle stream comprises 15 methane. This can be methane which was contained in the methanol residual gas stream 3 and was not taken up in the CO2 product stream 6. Correspondingly, the further reform recycle stream 15 can have a higher molar methane proportion than the methanol residual gas stream 3.

Even when the synthesis gas stream 1 can be provided with a high pressure by the synthesis gas reactor arrangement 9 during the autothermal reforming, a further pressure increase of the synthesis gas stream 1 can be advantageous for the methanol synthesis. It is therefore preferred that the synthesis gas stream 1 is brought to a synthesis pressure by a synthesis gas compressor 17 before it is fed to the methanol reactor arrangement 2. To enable the synthesis gas compressor 17 to be dimensioned smaller, part of the synthesis recycle stream 5 may be fed to the synthesis gas compressor 17 downstream of the methanol reactor arrangement 2 in terms of process technology. This finding with regard to the feed to the synthesis gas stream 1 relates to that part of the synthesis recycle stream 5 which is fed to the methanol reactor arrangement 2, that is, to the first recycle partial stream 5a in the present example. In this way, the synthesis gas compressor 17 does not also have to be designed to increase the pressure of the synthesis recycle stream 5.

This partial feeding of the synthesis recycle stream 5 downstream of the synthesis gas compressor 17 in terms of process technology can, on the one hand, take place upstream of the first reactor stage 2a of the methanol reactor arrangement 2 in terms of process technology. This feeding can, however, also, as depicted in FIG. 1, take place between a plurality of reactor stages 2a, b of the methanol reactor arrangement 2. In the case where the methanol reactor arrangement 2 comprises an intermediate compressor 17a between the reactor stages 2a, b, as depicted in FIG. 1, the partial feeding of the synthesis recycle stream 5 can take place upstream of the intermediate compressor 17a in terms of process technology.

The synthesis gas stream 1 can in principle also undergo further treatment steps. A preferred variant provides that before the synthesis gas stream 1 is fed to the methanol reactor arrangement 2, at least part of the synthesis gas stream 1 is fed to a shift conversion 38 for a water-gas shift reaction, preferably so that a molar proportion of hydrogen in the synthesis gas stream 1 is increased. This is particularly useful when more hydrogen-rich gas is required in the separation stream 8 for operating the fired heating device 16. It is preferred that the synthesis gas stream 1 is fed to the synthesis gas compressor 17 upstream of the shift conversion 38 in terms of process technology.

The above increase in the molar proportion of hydrogen in the synthesis gas stream 1 is preferably carried out in such a way that a part of the synthesis gas stream 1 fed to the shift conversion 38 is returned again. However, it can also be that part of the synthesis gas stream 1 fed to the shift conversion 38 is fed to a further CO2 remover, not shown here, and a further separation stream, which preferably contains hydrogen, obtained from the further CO2 remover, is fed to the fired heating device 16 for combustion. A further CO2 product stream, which preferably has a higher molar carbon dioxide proportion than the synthesis gas stream 1, can also be obtained from the further CO2 remover. The further CO2 remover can comprise a chemical scrub and/or a physical scrub for obtaining the further separation stream and the further CO2 product stream. The CO2 remover preferably comprises a further membrane device for separating off hydrogen. It is preferred that the further separation stream is obtained from a low-pressure side of the further membrane device. Accordingly, it is also preferred that the further CO2 product stream is obtained from a high-pressure side of the further membrane device.

In principle, the methanol residual gas stream 3 can be obtained from the methanol reactor arrangement 2 in any desired manner. However, it is preferred that the methanol reactor arrangement 2 comprises a methanol separation device 18 for producing the methanol residual gas stream 3 and a crude methanol stream 19 from a reactor product stream 20. The crude methanol stream 19 is then preferably fed to a distillation 22 for producing methanol 21. Said methanol separation device 18 can also, as shown in FIG. 1, consist of a plurality of separate devices.

It can especially be that the methanol separation device 18 comprises a condensation device 23 for producing the crude methanol stream 19 and the methanol residual gas stream 3 from the reactor product stream 20 by condensation. Especially in the event that the methanol reactor arrangement 2 comprises a plurality of reactor stages 2a, b, as shown in FIG. 1, the methanol separation device 18 can also comprise a plurality of such condensation devices 23. As depicted in FIG. 1, it can also be that a further methanol residual gas stream 3c is produced from the methanol separation device 18 and particularly from a condensation device 23 of the methanol separation device 18. This further methanol residual gas stream 3c is preferably returned to the methanol reactor device 2. As depicted in FIG. 1, this can take place, for example, in that the further methanol residual gas stream 3c, particularly, is fed to the synthesis gas stream 1 downstream of the synthesis gas compressor 17.

As an alternative or in addition to the condensation device 23, the methanol separation device 18 can comprise an expansion tank 24 for producing an expansion residual gas stream 25 from the reactor product stream 20 and/or from the crude methanol stream 19. In said expansion tank 24, the expansion residual gas stream 25 is obtained by expansion of the stream fed in each case. The crude methanol stream 19, which has now been expanded, is also obtained from the expansion tank 24. According to the illustration in FIG. 1, the expansion residual gas stream 25 can also be fed to the CO2 remover 4. Above all, when the crude methanol stream 19 produced from the condensation device 23 is fed to the expansion tank 24, an expansion residual gas stream 25 is obtained which essentially consists of carbon dioxide and therefore already has a high purity of carbon dioxide. Therefore, as will be described below, an otherwise provided scrubbing of the expansion residual gas stream 25, for example, using methanol as the scrubbing medium, can be dispensed with.

In principle, the hydrogen separator 7 can function according to any desired principle for separating at least part of the hydrogen from the synthesis recycle stream 5. With regard to the mode of operation of the hydrogen separator 7, however, it is particularly preferred that the hydrogen separator 7 comprises a membrane device for separating hydrogen. This makes it possible for the gas remaining after the hydrogen has been separated off, that is, the reform recycle stream 14, to be obtained at a comparatively high pressure. It is preferred that the separation stream 8 is obtained from a low-pressure side of the membrane device and the reform recycle stream 14 from a high-pressure side of the membrane device. This means particularly that the separation stream 8 is obtained from the membrane device at a lower pressure than the reform recycle stream 14. In addition, part of the reform recycle stream 14 is preferably removed from the separation stream 8. In particular, in those cases in which the reform recycle stream 14 is returned to the methanol synthesis cycle, the enrichment of nitrogen in said cycle can be limited in this way.

A high degree of hydrogen purity is not required for the separation stream 8, which is why the above removal of part of the reform recycle stream 14 is also harmless. For this reason, it can also be advantageous for a nitrogen-containing purge gas stream to be fed to the low-pressure side of the membrane device for diluting hydrogen. In other words, the purge gas stream is used to reduce the partial pressure of hydrogen on the low-pressure side of the membrane device, particularly by supplying nitrogen. In this way, it is possible to make the membrane device smaller at constant pressure on the low-pressure side and thus the separating flow 8 or to operate the low-pressure side at a higher pressure of the separating flow 8 with the membrane device having the same dimensions. In this way, a fan can be avoided before the separation stream 8 is fed to the fired heating device 16, even when the heating device 16 requires a higher pressure of the separation stream 8. In principle, said nitrogen-containing purge gas stream can come from any source. However, it is especially preferred that the nitrogen-containing purge gas stream is produced from the nitrogen stream 13.

Any design and basically any function are also conceivable for the CO2 remover 4. A preferred embodiment provides that the CO2 remover 4 comprises a scrubbing arrangement 26 for scrubbing carbon dioxide from the methanol residual gas stream 3. Using the scrubbing arrangement 26, the carbon dioxide can thus be effectively removed from that part of the methanol residual gas stream 3 which is fed to the CO2 remover 4. Likewise preferably, the CO2 remover 4 comprises a compressor arrangement 27 for increasing the pressure of the scrubbed carbon dioxide and for obtaining the CO2 product stream 6. This compressor arrangement 27 then makes it possible to provide the CO2 product stream 6 with a pressure which is sufficient for storage. The CO2 product stream 6 preferably has a pressure of at least 90 bar and particularly preferably of at least 100 bar, particularly after the pressure has been increased by the compressor arrangement 27. In addition to the already mentioned storage of the CO2 product stream 6, a further preferred variant provides the possibility that the CO2 product stream 6 is used for the production of urea.

Figure 2:
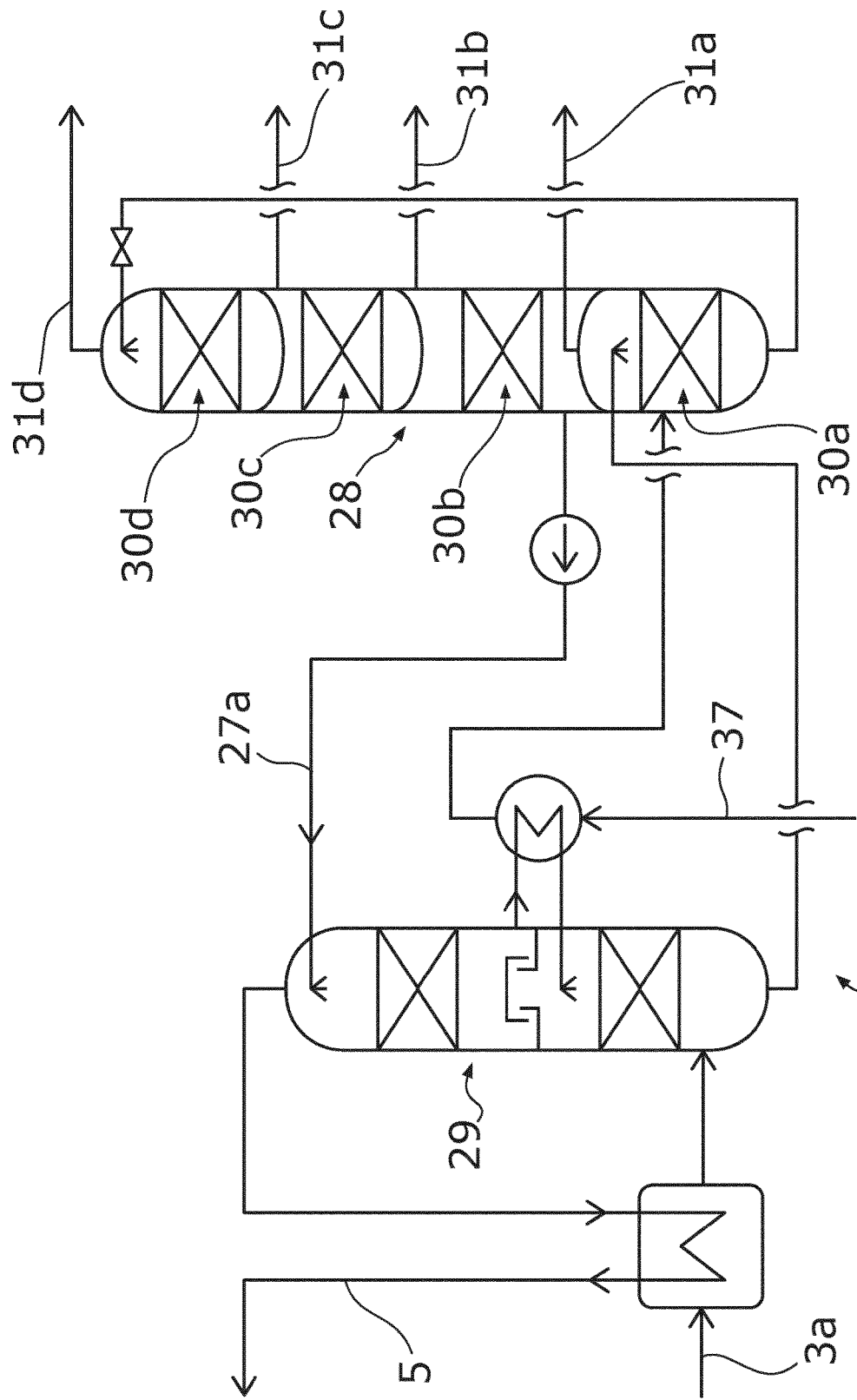

Different approaches are possible for the functioning of the scrubbing arrangement 26. It may be that the scrubbing arrangement 26 scrubs the carbon dioxide out of the methanol residual gas stream 3 by means of chemical scrubbing. In the case of such chemical scrubbing, the scrubbing medium can, for example, comprise ammonia or consist of ammonia. It can also be one of the known amine-based scrubbing processes such as, for example, Oasis, aMDEA, MDEA, MEA, DEA, KS1, Econamine. Another, preferred variant provides that the scrubbing arrangement 26 scrubs the carbon dioxide out of the methanol residual gas stream 3 by means of physical scrubbing. In the embodiment shown, the scrubbing arrangement 26 scrubs the carbon dioxide specifically from the first partial stream 3a of the methanol residual gas stream 3. For example, the physical scrubbing process used can be the known Rectisol, Purisol, Selexol or Sulfinol processes. With regard to the scrubbing arrangement 26, it is preferred that said scrubbing arrangement 26 comprises a cold circuit 27a having a scrubbing medium and a regeneration device 28. The scrubbing medium preferably comprises methanol. FIG. 2 offers a corresponding representation. This representation further shows that the scrubbing arrangement 26 preferably comprises an absorption device 29 for absorbing the carbon dioxide in the scrubbing medium.

The regeneration device 28 is advantageously configured to release carbon dioxide from the scrubbing medium. In principle, said regeneration device 28 can be designed as desired. On the one hand, the scrubbing medium can be heated in the regeneration device 28 to deliver the scrubbing medium. According to the illustration in FIG. 2, however, it can also be that the regeneration device 28 comprises a plurality of expansion stages 30a-d, so that the regeneration device 28 delivers a plurality of CO2 partial streams 31a-d containing carbon dioxide. Since the scrubbing medium is regularly expanded to a different pressure in each case in the various expansion stages, it is preferably provided that the plurality of CO2 partial streams 31a-d is delivered at a different pressure in each case.

Figure 3:
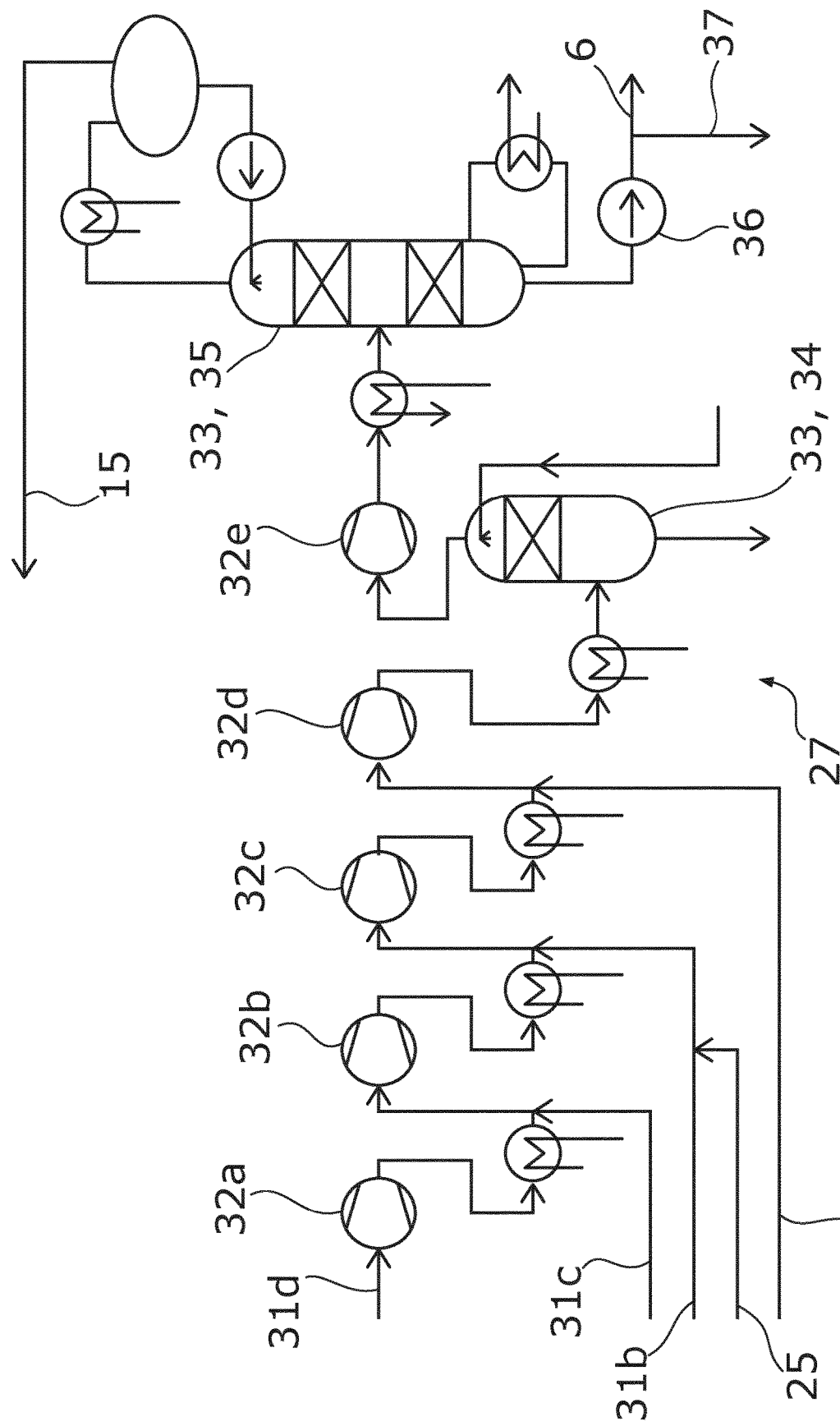

With regard to the compressor arrangement 27 of the CO2 remover 4, it is preferred that, as depicted in FIG. 3, the compressor arrangement 27 comprises a plurality of compressor stages 32a-e connected in series in terms of process technology. In other words, each compressor stage 32a-e increases the pressure of the stream which is provided by the respective upstream compressor stage 32a-e, except for compressor stage 32a, which is connected first in terms of process technology. In relation to the stream which is taken up by the compressor stage 32a, which is connected first in terms of process technology, the pressure increase of the individual compressor stages 32a-e thus adds up to a total pressure increase. The CO2 product stream 6 is obtained in this way already after the first compressor stage 32a, to which further streams can then be fed, as will be explained below.

Liquefied carbon dioxide or carbon dioxide that is in the supercritical state is particularly suitable for further processing and transport. A substance is in the supercritical state when the temperature and pressure are increased to such an extent that the densities of the liquid phase and gas phase are equal. The difference between these two aggregate states then disappears. For carbon dioxide, the supercritical state is reached at a temperature of 31° C. and a pressure of 73.8 bar. It can therefore be the case that the compressor arrangement 27 is configured to increase the pressure until the CO2 product stream 6 is liquefied. However, it is particularly preferred for the compressor arrangement 27 to be configured to increase the pressure until a supercritical state of the CO2 product stream 6 is reached. In this case, the temperature of the CO2 product stream 6 is above the critical temperature and the pressure of the CO2 product stream 6 is above the critical pressure.

In addition to the compressor stages 32a-e, the compressor arrangement 27 can also comprise devices for cleaning the CO2 product stream 6. It is thus preferred that the compressor arrangement 27 comprises a cleaning arrangement 33, at least part of which is downstream of the compressor stages 32a-e in terms of process technology, for removing methanol and for obtaining the further reform recycle stream 15.

This cleaning arrangement 33 preferably comprises a water scrubbing 34 for cleaning the CO2 product stream 6 with water. Such scrubbing with water is suitable for removing any remaining methanol. Likewise, the compressor arrangement 27 can also comprise a CO2 distillation 35, wherein it is specifically possible to obtain the further reform recycle stream 15 from the CO2 distillation 35. Particularly, any methane, carbon monoxide or hydrogen remaining in the CO2 product stream 6 can be separated and returned for further utilization by means of the CO2 distillation 35. As depicted in FIG. 3, the cleaning arrangement 33 can be arranged between the compressor stages 32a-e in terms of process technology. The CO2 distillation 35 can then be downstream of the cleaning arrangement 33 in terms of process technology. In this way, the CO2 distillation 35 can be operated at a pressure which is higher than the pressure in the cleaning arrangement 33.

As an alternative or in addition to the cleaning arrangement 33, the compressor arrangement 27 can comprise a liquid pump 36 for pumping the CO2 product stream 6. The further pressure increase of a liquid or a substance in the supercritical state by such a liquid pump 36 is possibly more efficient than with a gaseous substance. A particularly liquid partial stream of the CO2 product stream 6 is further advantageously used for cooling the cold circuit 27a. The cold circuit 27a can especially be cooled by evaporating a carbon dioxide stream 37, wherein the carbon dioxide stream 37 is preferably branched off from the CO2 product stream 6. After cooling the cold circuit 27a, the carbon dioxide stream 37 can be fed to the regeneration device 28. There is no loss of carbon dioxide due to the branching in this way. The carbon dioxide stream 37 is preferably a liquid carbon dioxide stream 37 or a carbon dioxide stream 37 in the supercritical state.

The provision of compressor stages 32a-e connected in series in terms of process technology has the particular advantage that streams having different pressures can be brought together better. It is thus preferably provided that the compressor arrangement 27 is fed a plurality of partial streams of scrubbed carbon dioxide between respectively different compressor stages 32a-e of the plurality for increasing the pressure. In this way, all partial streams having a higher pressure only have to be processed by downstream compressor stages 32a-e. As a result, the first compressor stages 32a-e can be dimensioned smaller. In relation to the multistage regeneration device 28 of the scrubbing arrangement 26 described above, it is therefore preferred that the plurality of CO2 partial streams 31a-d is fed between respectively different compressor stages 32a-e of the plurality for increasing the pressure. This state of affairs is shown particularly in FIG. 3.

In addition to the CO2 partial streams 31a-d from the regeneration device 28, however, further streams can also be fed to the compressor arrangement 27 for obtaining the CO2 product stream 6. It is therefore preferred that the expansion residual gas stream 25, which was obtained from the expansion tank 24, is fed to the compressor arrangement 27 between two compressor stages 32a-e. Due to the higher purity thereof, it may not have to be treated by the scrubbing arrangement 26.

For the variant described above having the shift conversion 38 and the further CO2 remover, it is preferred that the further CO2 product stream is also fed to the compressor arrangement 27 between two compressor stages 32a-e of the compressor arrangement 27 for obtaining the CO2 product stream 6, since the further CO2 product stream is already at a comparatively high pressure.

The invention claimed is:

1. A method for synthesizing a hydrogen-containing compound by,
    feeding a synthesis gas stream (1) comprising hydrogen and carbon oxides to a methanol reactor arrangement (2) for partial conversion into methanol;
    obtaining a methanol residual gas stream (3) from the methanol reactor arrangement (2), feeding at least part of the methanol residual gas stream (3) to a CO2 remover (4) to obtain a synthesis recycle stream (5) and a CO2 product stream (6), wherein the CO2 product stream (6) has a higher molar carbon dioxide proportion than the methanol residual gas stream (3);
    feeding a part (5a) of the synthesis recycle stream (5) to the methanol reactor arrangement (2), wherein a part (5b) of the synthesis recycle stream (5) is fed to a hydrogen separator (7) to obtain a separation stream (8), wherein the separation stream (8) has a higher molar hydrogen proportion than the synthesis recycle stream (5);
    obtaining a reform recycle stream (14) from the hydrogen separator (7) and feeding the reform recycle stream (14) to a synthesis gas reactor arrangement (9) for producing the synthesis gas stream (1), wherein the reform recycle stream (14) has a higher molar methane proportion than the synthesis recycle stream (5); and
    obtaining a further reform recycle stream (15) from the CO2 remover (4) and feeding the further reform recycle stream (15) to the synthesis gas reactor arrangement (9).

2. The method according to claim 1, wherein the synthesis gas stream (1) is produced from a carbon-containing energy carrier stream (10) in the synthesis gas reactor arrangement (9).

3. The method according to claim 2, wherein the synthesis gas stream (1) is produced from the carbon-containing energy carrier stream (10) in the synthesis gas reactor arrangement (9) by autothermal reforming.

4. The method according to claim 1, wherein before the synthesis gas stream (1) is fed to the methanol reactor arrangement (2), at least part of the synthesis gas stream is fed to a shift conversion (38) for a water-gas shift reaction.

5. The method according to claim 1, wherein the methanol reactor arrangement (2) comprises a methanol separation device (18) for producing the methanol residual gas stream (3) and a crude methanol stream (19) from a reactor product stream (20).

6. The method according to claim 1, wherein the hydrogen separator (7) comprises a membrane device for separating hydrogen having a low-pressure side.

7. The method according to claim 6, wherein a nitrogen-containing purge gas stream is fed to the low-pressure side of the membrane device for diluting the hydrogen in the separation stream (8).

8. The method according to claim 1, wherein the $CO_2$ remover (4) comprises a scrubbing arrangement (26) for scrubbing $CO_2$ from the methanol residual gas stream (3).

9. The method according to claim 8, wherein the scrubbing arrangement (26) scrubs the $CO_2$ out of the methanol residual gas stream (3) by chemical scrubbing and/or by physical scrubbing.

10. The method according to claim 9, wherein the scrubbing arrangement (26) comprises a cold circuit (27a) having a scrubbing medium with methanol and a regeneration device (28) configured to yield $CO_2$ from the scrubbing medium.

11. The method according to claim 8, wherein the $CO_2$ remover (4) comprises a compressor arrangement (27) for increasing the pressure of the scrubbed $CO_2$, wherein the compressor arrangement (27) comprises a plurality of compressor stages (32) connected in series.

12. The method according to claim 11, wherein the compressor arrangement (27) is fed with a plurality of partial streams of scrubbed CO2 between respectively different compressor stages (32) of the plurality for increasing the pressure.

13. A system for synthesizing a hydrogen-containing compound by the method of claim 1, the system comprising:
the methanol reactor arrangement (2), to which is fed the synthesis gas stream (1) comprising hydrogen and carbon oxides for partial conversion into methanol and for obtaining the methanol residual gas stream (3),
the CO2 remover (4), to which at least part of the methanol residual gas stream (3) is fed for obtaining the synthesis recycle stream (5) and the CO2 product stream (6), said CO2 product stream (6) having a higher molar carbon dioxide proportion than the methanol residual gas stream (3) and part of the synthesis recycle stream (5) being fed to the methanol reactor arrangement (2),
the hydrogen separator (7) to which at least part of the synthesis recycle stream (5) is fed to obtain the separation stream (8), wherein the separation stream (8) has a higher molar hydrogen proportion than the synthesis recycle stream (5); and
the synthesis gas reactor arrangement (9) for producing the synthesis gas stream (1).

14. The method according to claim 1, wherein the separation stream (8) is fed to a fired heating device (16) for combustion.

15. The method according to claim 6, wherein the separation stream (8) is obtained from a low-pressure side of the membrane device and a reform recycle stream (14) is obtained from a high-pressure side of the membrane device.

16. The method according to claim 15, wherein the separation stream (8) is obtained from the membrane device at a lower pressure than the reform recycle stream (14).

17. The method according to claim 1, wherein the hydrogen separator (7) is arranged downstream from the $CO_2$ remover (4).

* * * * *